US011327445B2

(12) United States Patent
Kato et al.

(10) Patent No.: US 11,327,445 B2
(45) Date of Patent: May 10, 2022

(54) ROTATION DETECTING APPARATUS AND ELECTRONIC TIMEPIECE

(71) Applicant: CASIO COMPUTER CO., LTD., Tokyo (JP)

(72) Inventors: Atsushi Kato, Akishima (JP); Mototaka Minakuchi, Fussa (JP); Chiharu Shiratori, Ome (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 324 days.

(21) Appl. No.: 16/589,194

(22) Filed: Oct. 1, 2019

(65) Prior Publication Data

US 2020/0103830 A1 Apr. 2, 2020

(30) Foreign Application Priority Data

Oct. 2, 2018 (JP) .............................. JP2018-187441

(51) Int. Cl.
*G04G 21/00* (2010.01)
*G04C 3/14* (2006.01)

(52) U.S. Cl.
CPC .............. *G04G 21/00* (2013.01); *G04C 3/146* (2013.01)

(58) Field of Classification Search
CPC ........ G04G 21/00; G04C 3/146; G04C 3/002; G04C 3/007; G04C 3/008; G01D 5/252;
(Continued)

(56) References Cited

U.S. PATENT DOCUMENTS 6,252,825 B1 * 6/2001 Perotto .................. G04C 3/007
368/185
9,250,058 B2 * 2/2016 Backes ................ G01D 5/2415
2018/0067459 A1 * 3/2018 Chung ................... G04C 3/005

FOREIGN PATENT DOCUMENTS

CN 103124896 A 5/2013
DE 10 2010 046 778 A1 3/2012
(Continued)

OTHER PUBLICATIONS

Notification of the First Office Action dated Nov. 25, 2020 received in Chinese Patent Application No. CN 201910892752.6 together with an English language translation.
(Continued)

*Primary Examiner* — Edwin A. Leon
(74) *Attorney, Agent, or Firm* — Scully Scott Murphy & Presser (57) ABSTRACT

A rotation detecting apparatus includes a rotating member, detectors regarding a rotating direction of the rotating member, and a predetermined unit. Each detector detects whether a predetermined standard direction is included in detecting ranges different for each rotating member and outputs a result. The predetermined unit combines the detection result output from each detector and extracts an angle range. The predetermined unit specifies the rotating direction of the rotating member based on changes in the angle ranges extracted a plurality of times occurring in the plurality of times. The detecting range corresponding to each of the plurality of detectors is determined to be able to identify relative positions before and after a change from the angle range extracted by the predetermined unit to the angle range that is clockwise or counterclockwise apart a predetermined number or less to the angle range extracted, the predetermined number being two or more.

19 Claims, 5 Drawing Sheets

(58) Field of Classification Search
CPC ....... G01D 5/2415; G01P 13/04; G01P 13/02; G01B 7/30
USPC ........................................................ 368/308
See application file for complete search history.

(56) References Cited

FOREIGN PATENT DOCUMENTS

| | | |
|---|---|---|
| EP | 3 007 013 A1 | 4/2016 |
| JP | S46-15510 Y | 5/1971 |
| JP | 2007-057275 A | 3/2007 |
| JP | 2008-134129 A | 6/2008 |
| JP | 2012-127967 A | 7/2012 |

OTHER PUBLICATIONS

Extended European Search Report dated Mar. 6, 2020 received in European Patent Application No. EP 19198954.0.

* cited by examiner

ROTATION DETECTING APPARATUS AND ELECTRONIC TIMEPIECE

CROSS-REFERENCE TO RELATED APPLICATION

This application is based upon and claims the benefit of priority from the prior Japanese Patent Application No. 2018-187441, filed on Oct. 2, 2018, the entire contents of which are incorporated herein by reference.

BACKGROUND

Technical Field

The technical field of the present application relates to a rotation detecting apparatus and an electronic timepiece.

Background Art

Electronic devices such as an electronic timepiece include a rotating switch such as a crown which receives operation of input by rotation, and similar to a mechanical timepiece, a position of a hand can be electrically adjusted based on a detected result of a rotation of the rotating switch. The rotating switch includes a configuration to output an electric signal for each rotation of a predetermined angle. The controller outputs to a driver of the hand a control signal to rotate the hand when such electric signal is detected.

Since there is a controller between the rotating switch of the electronic device and other members, the controller can control a plurality of different operations in response to detected patterns of the electric signals from the rotating switch. For example, as disclosed in JP 2008-134129, when the electric signal is input a certain number of times from the rotating switch within a predetermined amount of time, the control signal is output to the driver of the hand to continuously advance the operation to move the hand.

However, in order to accurately count the number of times that the electric signal is input, the electric signal needs to be detected with the resolution for the time according to the rotating speed of the predetermined angle of the rotating switch. The rotating operation of the rotating switch may be temporarily very fast, but the frequency that such rotating operation is performed is low compared to the operation time of the electronic device. Therefore, if the rotation is detected continuously and frequently in an electronic device in which power consumption is low and which does not need a high clock frequency, the power consumption becomes large, resulting in poor efficiency.

SUMMARY

One embodiment discloses a rotation detecting apparatus and an electronic timepiece.

To achieve at least one of the abovementioned objects, according to an aspect of the present disclosure, there is a rotation detecting apparatus including: a rotating member which rotates around a predetermined axis according to an operation from outside; a plurality of detectors regarding a rotating direction of the rotating member, wherein each of the plurality of detectors detects whether a predetermined standard direction is included in detecting ranges different for each rotating member and wherein each of the plurality of detectors outputs a detection result; and a predetermined unit, wherein, the predetermined unit combines the detection result output from each of the plurality of detectors and extracts an angle range of the rotating member, the predetermined unit specifies the rotating direction of the rotating member based on changes in the angle ranges extracted a plurality of times occurring in the plurality of times, and the detecting range corresponding to each of the plurality of detectors is determined to be able to identify relative positions before and after a change from the angle range extracted by the predetermined unit to the angle range that is clockwise or counterclockwise apart a predetermined number or less to the angle range extracted, the predetermined number being two or more.

DESCRIPTION OF EMBODIMENTS

Hereinafter, embodiments are described with reference to the drawings.

Figure 1:
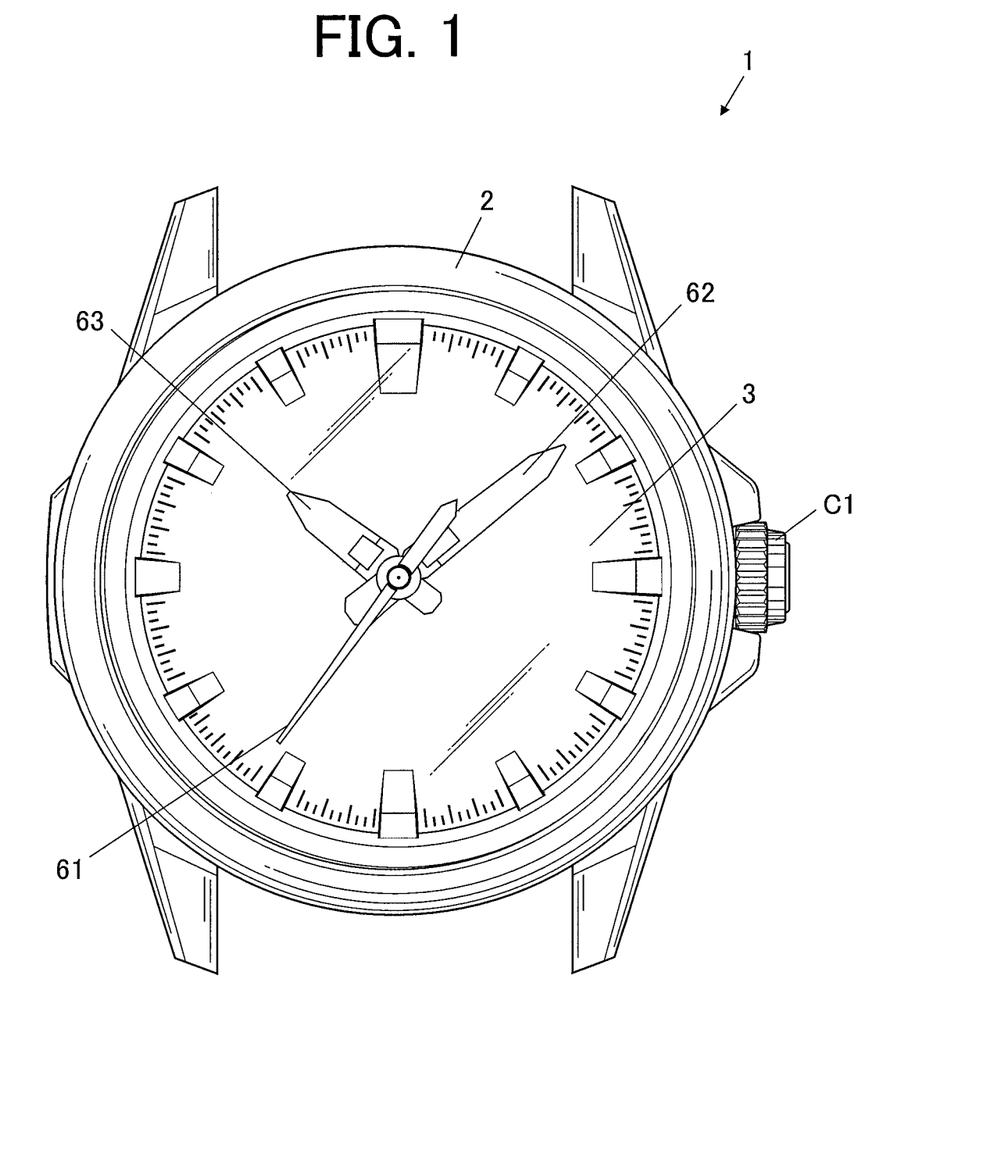
FIG. 1 is a front view of an electronic timepiece according to the present embodiment.

FIG. 1 is a front view showing an electronic timepiece 1 which is also a rotation detecting apparatus according to the present embodiment.

The electronic timepiece 1 displays the time using a second hand 61, a minute hand 62, and an hour hand 63 (also collectively referred as hands 61 to 63) including a common rotating axis position at substantially the center. The electronic timepiece 1 includes a casing 2, a dial 3, and windshield (not shown) which covers the surface above the dial 3. In a space surrounding the above, a rotating surface of the hands 61 to 63 is provided substantially parallel to the dial 3. A crown C1 (rotating member) is provided on a side surface of the casing 2.

The crown C1 receives an input operation from outside, mainly the user, and rotates around an axis passing through a center of the crown C1. The crown C1 can be pulled out from the casing 2 in two stages. Signals showing the pulled out state and the rotating position are output from the crown C1 to the CPU 41 (see FIG. 2) periodically, that is, at a predetermined time interval. If the crown C1 is not pulled out and not rotated, the output of the signal at the predetermined time interval is not necessary and this is necessary only when the crown C1 is pulled out. That is, in a state that the crown C1 is not pulled out, the signal is output at a time interval longer than the predetermined time interval or the signal is not output at all. The maximum speed that the user is able to rotate the crown C1 with the fingers is basically determined according to the size of the crown C1, the square area where the finger comes into contact, and the amount of mechanical resistance due to the rotation of the crown C1. The predetermined time interval is to be determined according to factors such as the above-described maximum speed and the rotating angle necessary to detect the rotating operation of the crown C1 once.

Figure 2:
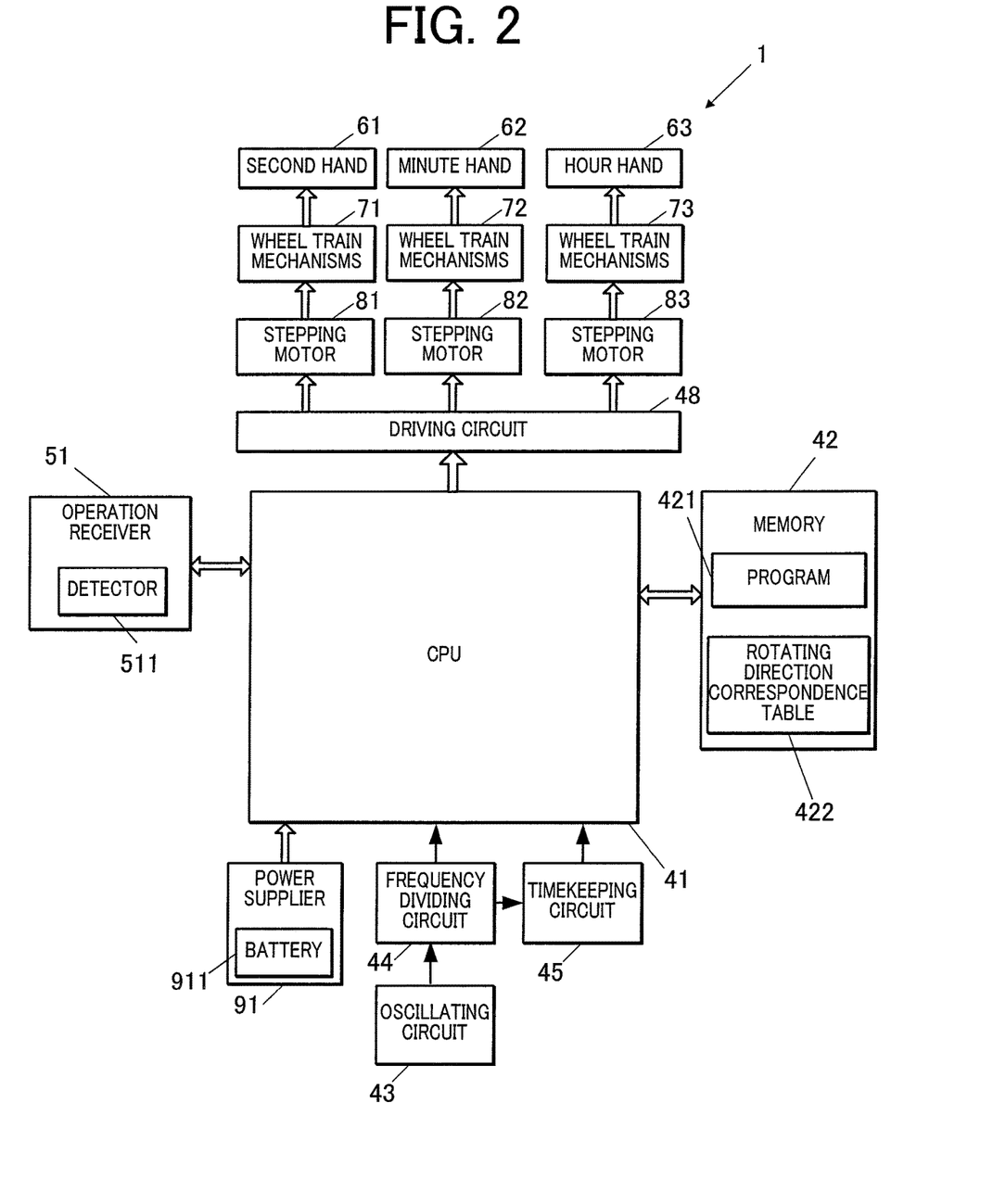
FIG. 2 is a block diagram showing a functional configuration of the electronic timepiece.

FIG. 2 is a block diagram showing a functional configuration of the electronic timepiece 1.

The electronic timepiece 1 includes a CPU 41 (extractor, specifier), a memory 42, an oscillating circuit 43, a frequency divider circuit 44, a clock circuit 45, a driving circuit 48, an operation receiver 51, wheel train mechanisms to 73 and stepping motors 81 to 83 respectively corresponding to hands 61 to 63, and power supplier 91.

The CPU 41 is a processor which performs various calculating processes and controls the entire operation of the electronic timepiece 1. The CPU 41 controls the operation of the hand to display the time. The CPU 41 converts the date/time calculated by the clock circuit 45 to a suitable local time as necessary and displays the set local time with the hands 61 to 63 in the mode to execute the function to display the time.

The electronic timepiece 1 may include a satellite radio wave receiving processor which receives the radio wave from a positioning satellite to obtain the date/time or information regarding the present position and/or a communicator which performs short distance wireless communication using Bluetooth (registered trademark), etc. The CPU 41 changes the setting of the local time based on the date/time obtained by the satellite radio wave receiving processor and the communicator and modifies the present date/time counted by the clock circuit 45.

The memory 42 holds the program 421 for various control executed by the CPU 41 and holds various setting data. The memory 42 also provides a memory space for jobs to the CPU 41. The memory space for jobs is set in the RAM. The program 421 and the setting data are stored in a nonvolatile memory such as a flash memory. Alternatively, among the program 421 and the setting data, those which are not changed can be stored in a mask ROM or changeable setting data can be stored in the RAM.

The program 421 includes a control program to detect rotation of the crown C1. The program 421 may include a control program to allow another electronic timepiece 1 to perform a predetermined operation. The setting data includes the later-described rotating direction correspondence table 422.

The oscillating circuit 43 generates and outputs a predetermined frequency signal. For example, the oscillating circuit 43 includes a crystal oscillator. The crystal oscillator can be attached externally, separate with relation to another configuration of the electronic timepiece 1 such as the IC chip in which the electronic circuit is provided.

The frequency divider circuit 44 divides the frequency signal output from the oscillating circuit 43 into signals used by the CPU 41 and the clock circuit 45 and outputs the signals. The output frequency can be set to be changeable by the control signal from the CPU 41.

The clock circuit 45 calculates the frequency of the divided signal input from the frequency divider circuit 44 to the initial value showing the predetermined date/time to calculate the present date/time and adds. The date/time calculated by the clock circuit 45 includes an error (rate) depending on the accuracy of the oscillating circuit 43. For example, the error may be about 0.5 seconds per day. The date/time calculated by the clock circuit 45 can be modified by the control signal from the CPU 41 based on date/time information obtained from outside.

The driving circuit 48 outputs a driving signal to operate the stepping motors 81 to 83. The CPU 41 outputs the control signal to the driving circuit 48 to rotate the hands 61 to 63. The driving circuit 48 outputs a driving pulse at a predetermined voltage to the stepping motors 81 to 83 according to the control signal from the CPU 41 to rotate the rotors of the stepping motors 81 to 83 at a predetermined angle (for example, 180 degrees) with relation to the stators. The driving circuit 48 can change a length of the driving pulse (pulse width) according to the state of the electronic timepiece 1. If a plurality of control signals to drive the plurality of hands are input simultaneously, the driving circuit 48 can slightly shift the output timing of the driving pulse to reduce the burden.

The operation receiver 51 receives the input operation from the user. The operation receiver 51 includes the above-described crown C1. According to the present embodiment, the crown C1 can be pulled out in two stages. The operation receiver 51 includes a detector 511. The detector 511 detects the pulled out state of the crown C1 or detects the rotating position (angle direction from rotating axis) of the crown C1 and outputs the electric signal according to the detected contents to the CPU 41. The operation receiver 51 can also be provided with one or a plurality of button switches to be pressed or a touch panel.

The power supplier 91 supplies power necessary to operate each unit from the battery 911 at a predetermined voltage. For example, the battery 911 may be a solar panel and a secondary battery. Alternatively, a detachable button type dry cell may be used as the battery 911. If a plurality of different voltages are output from the power supplier 91, for example, the power supplier 91 may include a switching power supply to be able to convert and output the voltage to a desired voltage.

The stepping motor 81 rotates the second hand 61 through the wheel train mechanism 71 which is an array of a plurality of wheels. If the stepping motor 81 is driven once, the second hand 61 rotates six times. The second hand 61 makes one rotation around the dial 3 when the stepping motor 81 operates 60 times.

The stepping motor 82 rotates the minute hand 62 through the wheel train mechanism 72. If the stepping motor 82 is driven once, the minute hand 62 rotates once. The minute hand 62 makes one rotation around the dial 3 when the stepping motor 82 operates 360 times.

The stepping motor 83 rotates the hour hand 63 through the wheel train mechanism 73. If the stepping motor 83 is driven once, the hour hand 63 rotates once. The hour hand 63 makes one rotation around the dial 3 when the stepping motor 83 operates 360 times. That is, the rotation and the rotating position of the hands 61 to 63 may be determined independently.

The hands 61 to 63 can be rotated in a forward direction (clockwise direction, right direction) and a reverse direction (counterclockwise direction, left direction). In the electronic timepiece 1, the hands 61 to 63 can be controlled to rotate continuously at a predetermined fast-forwarding speed.

Next, the detector 511 to detect the operation of the crown C1 and the operation to detect the rotation of the crown C1 are described.

According to the electronic timepiece 1 of the present embodiment, detection is made to detect whether the reference position of the rotating direction of the crown C1 (predetermined standard direction) is within detecting ranges different from each other, here, three 90 degree ranges shifted 60 degrees each, and outputs the signal showing the detection result.

Figure 3A:
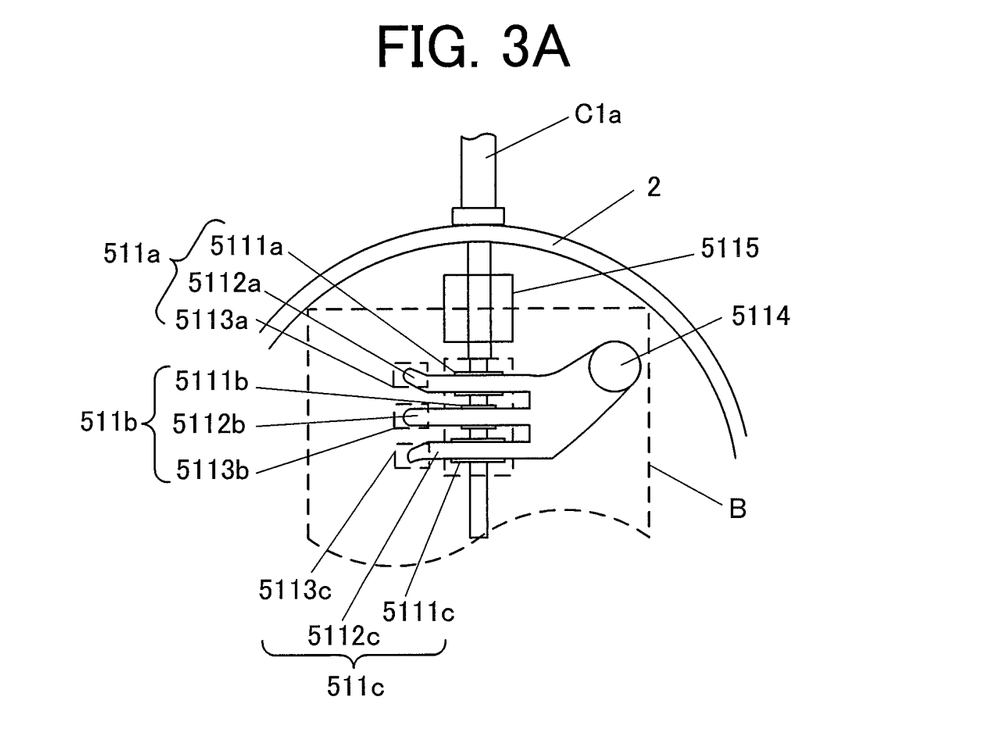
FIG. 3A is a diagram describing a configuration to detect operation of a crown.
Figure 3B:
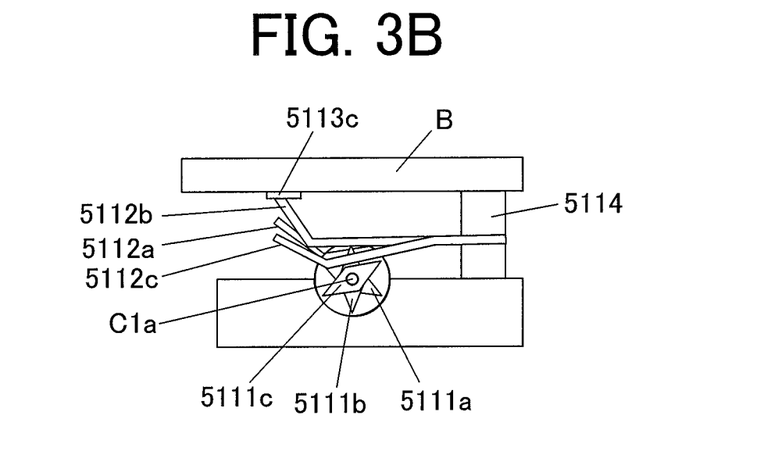
FIG. 3B is a diagram describing a configuration to detect the operation of the crown.

FIG. 3A and FIG. 3B are diagrams describing the configuration to detect the operation of the crown C1.

As shown in FIG. 3A, a shaft C1a of the crown C1 is connected to a pull out position detector 5115 which detects the pull out operation inside the casing 2 and a configuration to detect the rotation. The three rotating members 5111a to 5111c which rotate linked with the shaft C1a are shaped including a convex portion in which the distance from the shaft C1a becomes large in predetermined directions separated 60 degrees each and 180 degrees opposite the predetermined directions. According to the present embodiment, the rotating members 5111a to 5111c are members in a rhombus shape.

Regarding arm portions 5112a to 5112c, one end is fixed to a fixing portion 5114, and the other portions each have a bent shape passing above the rotating members 5111a to 5111c. When a convex portion of one of the rotating members 5111a to 5111c extends upward, this comes into contact with the arm portions 5112a to 5112c and the arm portions 5112a to 5112c are pushed upward. The other end opposite the one end in the arm portions 5112a to 5112c pushed up comes into contact with circuit exposing surfaces 5113a to 5113c on the circuit board B. With this, each of the arm portions 5112a to 5112c is pushed up in order while the crown C1 rotates and these connect to the circuit exposing surfaces 5113a to 5113c.

Since the one end side fixed to the fixing member 5114 is grounded to the circuit board, the circuit exposing surfaces 5113a to 5113c are grounded while connected to the arm portions 5112a to 5112c. Such grounded state is detected electrically. The rotating member 5111a, the arm portion 5112a, and the circuit exposing surface 5113a are included in a first detector 511a, the rotating member 5111b, the arm portion 5112b, and the circuit exposing surface 5113b are included in a second detector 511b, and the rotating member 5111c, the arm portion 5112c, and the circuit exposing surface 5113c are included in a third detector 511c.

Among the first detector 511a, the second detector 511b, and the third detector 511c (collectively called the plurality of detectors), the rotating position (angle range) of the crown C1 is determined (extracted) in a unit of 30 degrees from the combination in which the arm portions 5112a to 5112c are in contact with (grounded) the circuit exposing surfaces 5113a to 5113c. Each detector outputs a signal showing that the above are grounded in two positions (plurality of positions) while the crown C1 makes a rotation of one circle, that is, every 180 degrees. However, regarding the crown C1, the rotating position itself (the above-described angle in the predetermine direction) is not important. Whether there is rotation, that is, the change of the rotating position over time is important. Therefore, it is not necessary to be able to distinguish between one convex portion and another convex portion in the rotating members 5111a to 5111c.

Figure 4A:
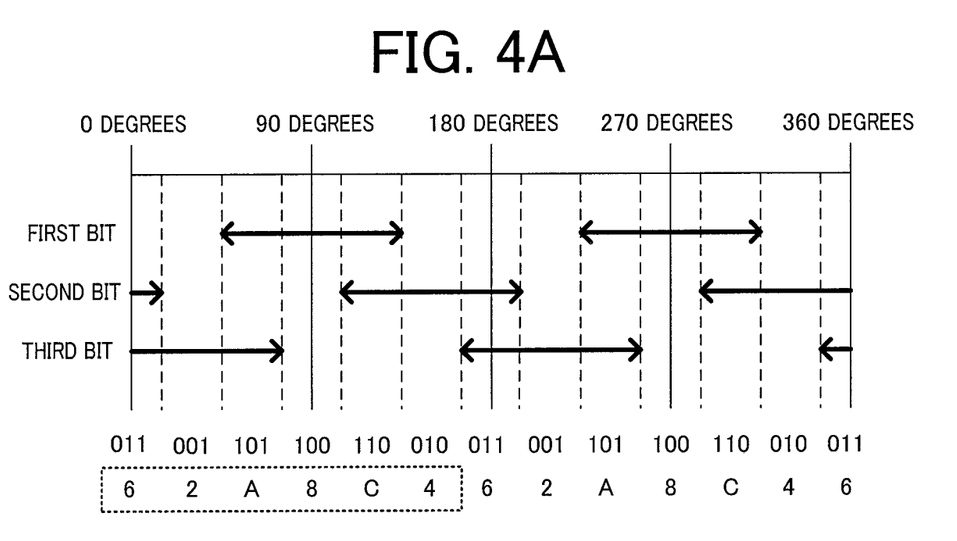
FIG. 4A is a table showing output corresponding to a rotating position.
Figure 4B:
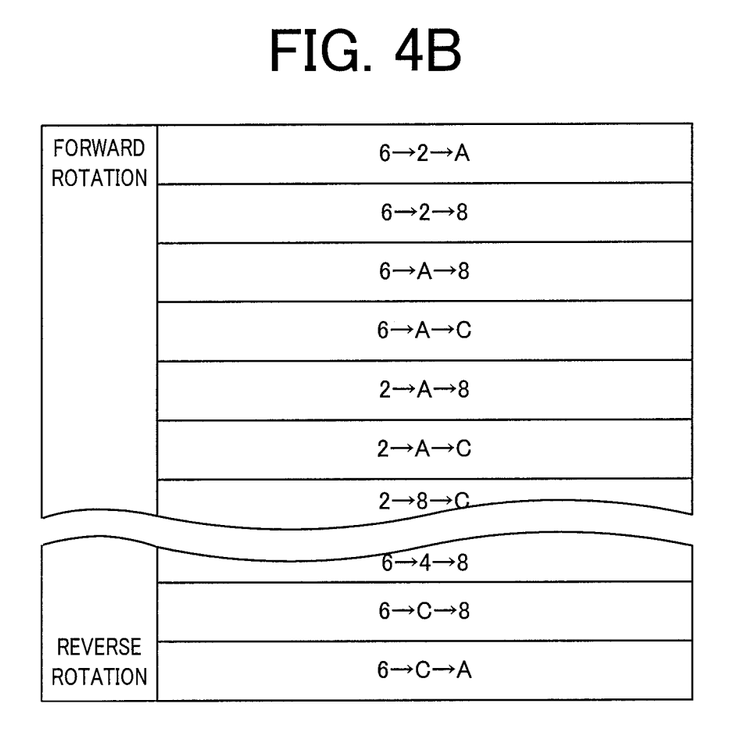
FIG. 4B is a table showing a portion of a rotating direction correspondence table.

FIG. 4A and FIG. 4B are tables showing the output corresponding to the rotating position and the rotating direction according to the output.

As shown in FIG. 4A, for example, at the timing when the signal is output at the predetermined time interval, if the crown C1 is within the detecting ranges 45 to 135 degrees or 225 to 315 degrees according to the rotating member 5111a, the operation receiver 51 outputs a signal "1" as the first bit and if the crown C1 is in the other ranges, the operation receiver 51 outputs a signal "0". If the crown C1 is within the detecting ranges 105 to 195 degrees or 285 to 375 (15) degrees according to the rotating member 5111b, the operation receiver 51 outputs a signal "1" as the second bit, and if the crown C1 is in the other ranges, the operation receiver outputs a signal "0". If the crown C1 is within the detecting ranges 165 to 255 degrees or 345 to 435 (75) degrees according to the rotating member 5111c, the operation receiver 51 outputs a signal "1" as the third bit, and if the crown C1 is in the other ranges, the operation receiver 51 outputs a signal "0". Each of the three detecting ranges overlaps with the adjacent detecting ranges in an amount of 30 degrees (a portion). According to the combination of the three bits, the angle range in which the crown C1 belongs is extracted in a unit of 30 degrees (equal width) with relation to a predetermined standard direction (for example, 0 degree direction). The value showing the angle range exemplified here is shown for the purpose of description, and in actual implementations, the value itself does not have to be obtained if the range of the relative position with reference to any certain position can be specified (according to the present embodiment it is considered that the range is specified if specified within two relative position ranges included in 360 degrees).

The operation receiver 51 arranges the three one-bit data in order, adds "0" as the final fourth bit, converts the value to a binary value, and outputs the value to the CPU 41. If the crown C1 rotates in a predetermined forward direction, the output four bit values change every 30 degrees in a hexadecimal display in the following order, 0x06, 0x02, 0x0A, 0x08, 0x0C, 0x04. If the crown C1 is rotated in a reverse direction opposite of the forward direction, the values in a hexadecimal display change in a reverse order. As described above, while the crown C1 rotates once, the values in the hexadecimal display appear twice in a certain cycle. Therefore, if two angle ranges are skipped within one signal output, it is not possible to distinguish whether the rotation is in the forward direction or the reverse direction. With relation to any initial position of the crown C1 (angle range which can be extracted), there are no values which are the same in a hexadecimal display in two or less values before and after such initial position. Therefore, the rotating positions of the crown C1 can be identified. If the skip of the value is one or less, it is considered that the skip is not three or more, and the rotating direction of the crown C1 is specified according to the changing pattern of the hexadecimal numerals.

FIG. 4B is a table showing a portion of a rotating direction correspondence table 422. The rotating direction correspondence table 422 lists all patterns (plurality of arrays) in which the rotating direction can be specified. The relation between an array of rotating positions, that is, three hexadecimal values with a predetermined standard number of changes (here twice) and the rotating direction corresponding to the array is shown. If the output of signals including a predetermined standard number of changes within a standard time is obtained a plurality of number of times (three times) and an array of a plurality of hexadecimal values (three) is obtained from the plurality of signal outputs (three angle directions are extracted), these are compared with the reference array of the rotating direction correspondence table 422. By searching for a match, the rotating direction corresponding to the searched and retrieved array order can be obtained. For example, when the three hexadecimal values are "0x06", "0x0A", "0x0C" in order, it is determined from the rotating direction correspondence table 422 that the crown C1 rotated in the forward direction. Here, the direction in which the amount (absolute value) of the angle differences of the angle ranges extracted a plurality of times in a consecutive order becomes smaller and the direction in which the skip in the same direction is 0 or 1, that is, the amount of the angle difference changed 60 degrees or less (predetermined standard difference) are specified as the rotating direction of the crown C1 (it is not considered that the rotation jumped 300 degrees in the reverse direction). There are four such detecting patterns for the first six angle ranges in one rotating direction, the total being 24 patterns. If there is a change in the angle difference larger than 60 degrees in the two changes or the change is in the opposite direction in the two changes, influence such as the error in the circuit (for example, chattering) is considered and the detection is ignored.

Figure 5:
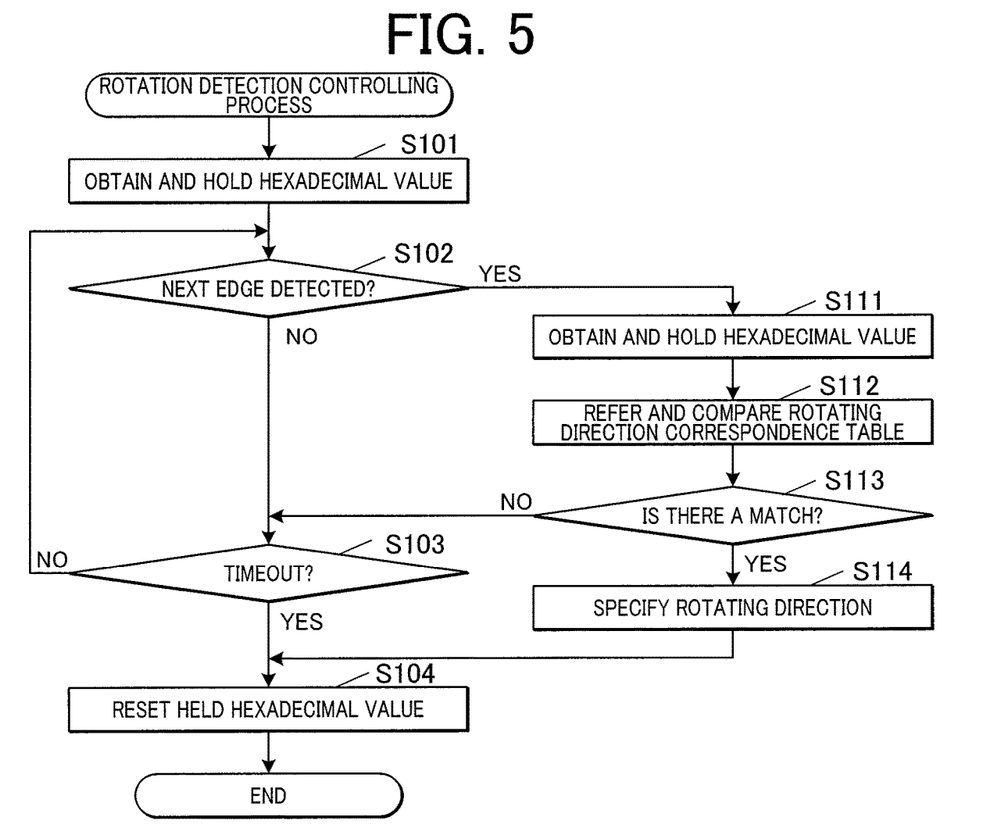
FIG. 5 is a flowchart showing a process of control in a rotation detection controlling process.

FIG. 5 is a flowchart showing a control procedure by the CPU 41 in the rotation detection controlling process executed in the electronic timepiece 1. Such rotation detection controlling process starts with the detector detecting the edge showing the change of the output value as the trigger.

The CPU 41 obtains the hexadecimal value of the output value after the change as the trigger and holds the value (step S101). The CPU 41 determines whether the next signal showing the edge detection is obtained (step S102). If it is determined that it is not detected ("NO" in step S102), the process by the CPU 41 proceeds to step S103.

If it is determined that the signal showing the edge detection is obtained ("YES" in step S102), the hexadecimal value after edge detection is obtained and held (step S111). The CPU 41 refers to the rotating direction correspondence table 422 and compares this with the obtained array of the hexadecimal values (step S112). The CPU 41 determines whether there is a match with the array of the hexadecimal values shown in the rotating direction correspondence table 422 (step S113). If it is determined that there is no match ("NO" in step S113, includes when two hexadecimal values are held), the process by the CPU 41 proceeds to step S103.

If it is determined that there is a match with the array of the hexadecimal values shown in the rotating direction correspondence table 422 ("YES" in step S113), the CPU 41 specifies the rotating direction corresponded to the array (step S114). Then, the process by the CPU 41 proceeds to step S104.

If the process proceeds from step S102 or step S113 to step S103, the CPU 41 determines whether the elapsed time after obtaining the first hexadecimal value is a standard time or longer, and determines whether timeout occurred (step S103). If it is determined that timeout did not occur ("NO" in step S103), the process by the CPU 41 proceeds to step S102. If it is determined that timeout occurred ("YES" in step S103), the process by the CPU 41 proceeds to step S104.

If the process proceeds from steps S103 and S114 to step S104, the CPU 41 erases the held hexadecimal value and resets the value (step S104). With this, the CPU 41 ends the rotation detection controlling process.

Figure 6:
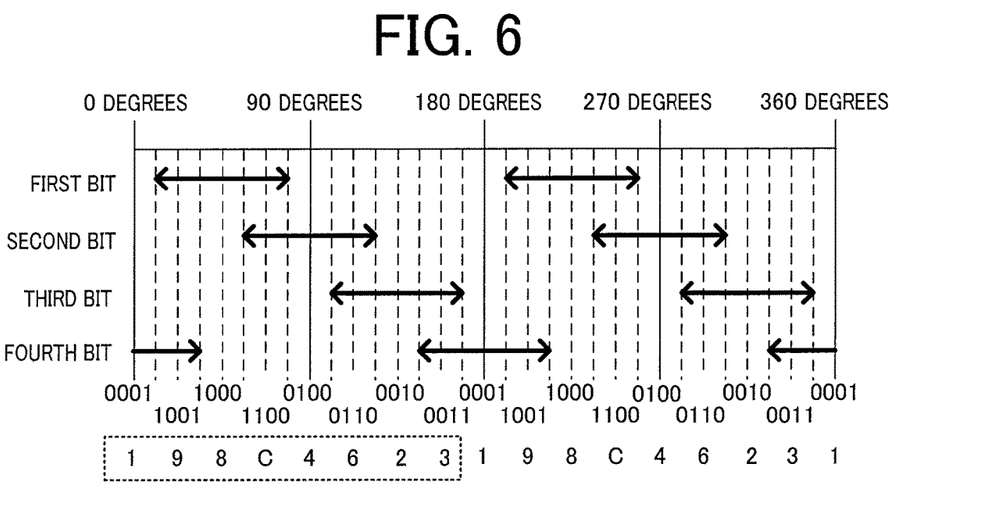
FIG. 6 is a diagram showing a modification of a detector which detects a rotation of the crown.

FIG. 6 is a diagram showing a modification of the detector which detects the rotation of the crown C1 in the electronic timepiece 1 according to the present embodiment.

According to the modification, four detectors are provided to detect the rotation of the crown C1. Here, for example, each detector includes a detecting range of 67.5 degrees shifted 45 degrees from the adjacent detector. With this, the angle range of the crown C1 is specified in a unit of 22.5 degrees. In this case, even if two skips occur at once when the rotation of the crown C1 is detected, the direction of rotation can be specified.

In this case, the rotation of 22.5 to 67.5 degrees is allowed within two detections. The detecting pattern of three detections with rotation in one direction is nine patterns for the first eight angle ranges, the total being 72 patterns.

As described above, the electronic timepiece 1 which is also a rotation detecting apparatus according to the present embodiment includes a crown C1 which rotates around a predetermined axis according to an operation from outside, a plurality of detectors (first detector 511*a*, second detector 511*b*, and third detector 511*c*) which detect whether a predetermined standard direction regarding the rotating direction of the crown C1 is included in the detecting ranges of the crown C1 which are different from each other and which output the detected result, and a CPU 41. The CPU 41 functions as an extractor which extracts an angle range of the crown C1 from the combination of the detected results output from the plurality of detectors. The CPU 41 functions as the specifier to specify the rotating direction of the crown C1 based on the change within the plurality of times that the angle range was extracted. The plurality of (three) detecting ranges corresponding to each of the plurality of (three) detectors is determined to be able to identify the relative position before and after the change from the angle range which can be extracted from the CPU 41 as the extractor to the angle range that is clockwise or counterclockwise apart a predetermined number (two) or less to the angle range extracted. That is, as shown in FIG. 4A, for example, with relation to the angle range specified with the hexadecimal value "A", the angle ranges separated+1 and +2 are specified with the hexadecimal values "C" and "4" respectively, the angle ranges separated−1 and −2 are specified with the hexadecimal values "2" and "6" respectively, and the relative positions of the four angle ranges with relation to the original angle range are uniquely determined.

With this, even if the changes among the adjacent angle ranges are all not set with high detection frequencies which can be specified, the rotating direction can be specified without reducing the detection sensitivity. Therefore, the detection of rotation of the rotating switch can be performed with more efficiency in the electronic timepiece 1 (rotation detecting apparatus).

As the specifier, the CPU 41 specifies the direction in which the amount of the angle difference between the angle ranges extracted in a consecutive order is smaller as the rotating direction. That is, the detection frequency is set so that the skip does not occur equal to or more than half of one rotation of the crown C1. With this, it is possible to uniquely determine the rotating direction. Therefore, the detecting frequency can be lowered so as not to be a problem even if there are some skips in the detection. Consequently, the increase of the power consumption can be suppressed without reducing the rotation detection accuracy of the crown C1.

The CPU 41 functions as the specifier which specifies the direction in which the amount of the angle difference between the angle ranges extracted in a consecutive order is a predetermined standard difference (here, 60 degrees as two angle ranges) or less as the rotating direction. That is, a detecting frequency in which a drastically large skip in the detection does not occur in the rotation detection of the crown C1 and in which a slight skip is allowed is set. With this, it is possible to suppress increase in the power consumption without decreasing the accuracy of the rotation of the crown C1. If a large skip in the detection occurs, such skip is ignored and the CPU 41 performs the detection of rotation within a range of a normal rotating speed. Therefore, the error in the determination can be avoided.

A portion of adjacent detecting ranges among the plurality of detecting ranges overlap with each other regarding a rotating direction. With this, the angle range can be suitably narrowed by the combination of the result detected by the plurality of detectors. Therefore, the detection of the rotation can be performed at a higher sensitivity compared to the number of detectors.

The detecting range is determined so that the angle ranges are to be equal. With this, the rotation detecting apparatus (electronic timepiece 1) is able to detect the rotation equally without the unevenness in detection of the rotation occurring.

The detecting range corresponding to at least one detector is provided divided into a plurality of positions (here, two positions) while the crown C1 makes one rotation. The detection of the rotation does not have to be information of an absolute position in the angle range, and only the relative change needs to be obtained. Therefore, compared to the number of detectors, the angle range can be narrowed. With this, the accuracy of the detection of the rotation can be enhanced even more efficiently.

If the angle ranges extracted within a standard time changes in the same direction a standard number of times (here, twice), the CPU 41 functions as the specifier to specify that the detected direction is the rotating direction. Depending on the position of the rotating members 5111a to 5111b, one change in the angle range may be a change detected accidentally due to a slight movement. By detecting the change in the same direction a plurality of times, it is determined that the rotation is detected only when the crown C1 is rotated surely in a predetermined angle (30 degrees) or more by external operation by the user, for example. With this, the error in determination can be prevented.

The electronic timepiece 1 includes a memory 42 which stores as the rotating direction correspondence table 422 the relation corresponding the reference array aligning a plurality of angle ranges in an array with the rotating direction of the crown C1 specified when the angle ranges are changed in the order of the reference array. The CPU 41 functions as the specifier which compares the array of the angle ranges extracted based on the detection result obtained a plurality of times with the reference array and specifies the rotating direction corresponding to the matching reference array.

By holding in advance an array of the angle range with which the rotating direction can be specified, the rotating direction can be easily specified with a simple comparison process without a burden.

The CPU 41 functions as the extractor which shows whether the standard direction is included in the detecting range corresponding to the plurality of detectors as one-bit data, and which shows the extracted angle range by arranging in order the one-bit data converted to a numeric value. The memory 42 stores the plurality of values which are obtained by converting to numeric values and which are aligned in an array as the reference array. As described above, the angle range is expressed by a short bit array generated with an easy procedure. Therefore, the comparison process to specify the rotating direction becomes easy.

The electronic timepiece 1 according to the present embodiment includes the above-described rotation detecting apparatus and the crown C1. Therefore, according to the electronic timepiece 1, the rotation of the crown C1 can be detected easily and reliably without increasing the power consumption. With this, the rotating direction can be specified more efficiently.

The embodiments are not limited to those described above, and various modifications are possible.

For example, according to the present embodiment, the rotating direction is determined when the change of the detection signal with rotation is detected twice. Alternatively, the condition to determine the rotating direction can be to detect a predetermined number of times such as three or more times.

Even if the rotating direction cannot be determined from some of the detections among the plurality of detections of rotation (for example, change with two skips as described in the present embodiment), if the rotating direction can be determined from the remaining other detections, the rotating direction can be determined.

According to the present embodiment, a portion of the adjacent detecting ranges are overlapped, and the detecting ranges are provided in two positions within one rotation. With this, the rotation detecting angle can be set finely compared to the number of detectors. Alternatively, the adjacent detecting ranges do not have to be overlapped, or the detecting ranges do not have to be provided in two positions within one rotation. Alternatively, the adjacent detecting ranges do not have to be overlapped, and the detecting ranges do not have to be provided in two positions within one rotation. In such cases, the number of detectors may be increased. According to the present embodiment, the array of angle ranges with which the rotating direction can be determined is held in advance as the rotating direction correspondence table 422, and the rotating direction is determined by comparison with such table. However, the process to obtain the rotating direction can be performed in the program 421. According to the present embodiment, the one-bit data output from the detector is arranged as is and is converted to binary values. Alternatively, the conversion to binary numerals may be performed according to the order of the angle ranges.

According to the present embodiment, the rotation detecting angle of the crown C1 is set equally (angle range is set equally), but the angle range may be set slight differently. Moreover not only the direction of rotation but also the value itself of the relative angle from the predetermined standard direction can be used. In this case, the detecting range of each detector is determined so that the same value is repeated in the unit of 180 degrees or the change for one rotation occurs at 360 degrees.

According to the present embodiment, the detection of the rotating direction when the crown C1 of the electronic timepiece 1 is rotated is described, but the embodiment is not limited to the above. The present embodiment may be applied to any electronic device which detects a rotation in a unit of a certain angle and which outputs a control signal. A part such as a crown C1 in which an entire side in a perpendicular direction with relation to the rotating axis is exposed does not have to be used.

The specific details of the present embodiment such as the structures, the positioning of the structures, and the contents to control the structures can be suitably modified without leaving the scope of the present invention.

Although various embodiments are described, the scope of the present invention is not limited to the above-described embodiments, and the present invention includes the scope described in the attached claims and its equivalents.

What is claimed is:

1. A rotation detecting apparatus comprising:
   a rotating member configured to rotate around a predetermined axis according to an operation from outside;
   a plurality of detectors,
      wherein at each of a plurality of output timings, each of the plurality of detectors is configured to output a bit having one of a first value and a second value,
      wherein the first value of the each of the plurality of detectors represents two or more possible angular ranges in which the rotating member is rotated, and the second value of the each of the plurality of detectors represents two or more other possible angular ranges in which the rotating member is rotated,
wherein the two or more possible angular ranges represented by the first value of one of the plurality of detectors is different from the two or more possible angular ranges represented by the first value of another of the plurality of detectors,
wherein the two or more possible angular ranges represented by the second value of the one of the plurality of detectors is different from the two or more possible angular ranges represented by the second value of the another of the plurality of detectors, and
wherein each of a plurality of combinations of the bits of the plurality of detectors identifies one of a plurality of angle ranges in which the rotating member belong, respectively;
a processor configured to:
at a first of the plurality of output timings, acquire one of the plurality of combinations of the bits identifying one of the plurality of angle ranges and at a second of the plurality of output timings, acquire another of the plurality of combinations of the bits identifying another of the plurality of angle ranges; and
specify a rotating direction of the rotating member based on a change in the one of the plurality of angle ranges and the another of the plurality of the angle ranges identified by the one of the plurality of combinations and the another of the plurality of combinations.

2. The rotation detecting apparatus according to claim 1, wherein the processor is configured to the detecting range corresponding to each of the plurality of detectors is determined to be able to identify relative positions of the rotating member before and after the change in the one of the plurality of angle ranges and the another of the plurality of the angle ranges.

3. The rotation detecting apparatus according to claim 1, wherein the change in the one of the plurality of angle ranges and the another of the plurality of angle ranges represent a first angle difference having a first size in a first direction and a second angle difference having a second size in a second direction, and
wherein the processor is configured to:
in a case where the first size of the first angle difference is smaller than the second size of the second angle difference, specify the first direction as the rotating direction; and
in a case where the second size of the second angle difference is smaller than the first size of the first angle difference, specify the second direction as the rotating direction.

4. The rotation detecting apparatus according to claim 1, wherein the change in the one of the plurality of angle ranges and the another of the plurality of angle ranges represent a first angle difference having a first size in a first direction and a second angle difference having a second size in a second direction, and
wherein the processor is configured to:
in a case where the first size of the first angle difference is a predetermined standard difference or smaller, specify the first direction as the rotating direction; and
in a case where the second size of the second angle difference is the predetermined standard difference or smaller, specify the second direction as the rotating direction.

5. The rotation detecting apparatus according to claim 1, wherein a portion of adjacent angular ranges between the two or more possible angular ranges represented by the first value of the one of the plurality of detectors and the two or more possible angular ranges represented by the first value of another of the plurality of detectors overlap on each other, and
wherein a portion of adjacent angular ranges between the two or more possible angular ranges represented by the second value of the one of the plurality of detectors and the two or more possible angular ranges represented by the second value of the another of the plurality of detectors overlap on each other.

6. The rotation detecting apparatus according to claim 2, wherein a portion of adjacent angular ranges between the two or more possible angular ranges represented by the first value of the one of the plurality of detectors and the two or more possible angular ranges represented by the first value of another of the plurality of detectors overlap on each other, and
wherein a portion of adjacent angular ranges between the two or more possible angular ranges represented by the second value of the one of the plurality of detectors and the two or more possible angular ranges represented by the second value of the another of the plurality of detectors overlap on each other.

7. The rotation detecting apparatus according to claim 3, wherein a portion of adjacent angular ranges between the two or more possible angular ranges represented by the first value of the one of the plurality of detectors and the two or more possible angular ranges represented by the first value of another of the plurality of detectors overlap on each other, and
wherein a portion of adjacent angular ranges between the two or more possible angular ranges represented by the second value of the one of the plurality of detectors and the two or more possible angular ranges represented by the second value of the another of the plurality of detectors overlap on each other.

8. The rotation detecting apparatus according to claim 1, wherein each of the two or more possible angular ranges represented by the first value of the one of the plurality of detectors and each of the two or more possible angular ranges represented by the first value of the another of the plurality of detectors are equal in size.

9. The rotation detecting apparatus according to claim 2, wherein each of the two or more possible angular ranges represented by the first value of the one of the plurality of detectors and each of the two or more possible angular ranges represented by the first value of the another of the plurality of detectors are equal in size.

10. The rotation detecting apparatus according to claim 3, wherein each of the two or more possible angular ranges represented by the first value of the one of the plurality of detectors and each of the two or more possible angular ranges represented by the first value of the another of the plurality of detectors are equal in size.

11. The rotation detecting apparatus according to claim 1, wherein the two or more possible angular ranges represented by the first value of the one of the plurality of detectors and the two or more possible angular ranges represented by the second value of the one of the plurality of detectors are provided by dividing a plurality of positions in one rotation of the rotating member.

12. The rotation detecting apparatus according to claim 2, wherein the two or more possible angular ranges represented by the first value of the one of the plurality of detectors and the two or more possible angular ranges represented by the second value of the one of the plurality of detectors are provided by dividing a plurality of positions in one rotation of the rotating member.

13. The rotation detecting apparatus according to claim 3, wherein the two or more possible angular ranges represented by the first value of the one of the plurality of detectors and the two or more possible angular ranges represented by the second value of the one of the plurality of detectors are provided by dividing a plurality of positions in one rotation of the rotating member.

14. The rotation detecting apparatus according to claim 2, wherein the processor is configured to:
   determine whether, within a standard time, the change in the one of the plurality of angle ranges and the another of the plurality of the angle ranges in the same direction is successive for two or more times; and
   in response to determining that, within the standard time, the change in the one of the plurality of angle ranges and the another of the of the plurality of the angle ranges in the same direction is successive for two or more times, specify the same direction as the rotating direction.

15. The rotation detecting apparatus according to claim 3, wherein the processor is configured to:
   determine whether, within a standard time, the change in the one of the plurality of angle ranges and the another of the plurality of the angle ranges in the same direction is successive for two or more times; and
   in response to determining that, within the standard time, the change in the one of the plurality of angle ranges and the another of the of the plurality of the angle ranges in the same direction is successive for two or more times, specify the same direction as the rotating direction.

16. The rotation detecting apparatus according to claim 4, wherein the processor is configured to:
   determine whether, within a standard time, the change in the one of the plurality of angle ranges and the another of the plurality of the angle ranges in the same direction is successive for two or more times; and
   in response to determining that, within the standard time, the change in the one of the plurality of angle ranges and the another of the of the plurality of the angle ranges in the same direction is successive for two or more times, specify the same direction as the rotating direction.

17. The rotation detecting apparatus according to claim 2, further comprising a memory configured to store a relation of correspondence between a stored direction and a stored change in a first angle range and a second angle range,
   wherein the processor is configured to:
      determine whether the change in the one of the plurality of angle ranges and the another of the plurality of the angle ranges matches the stored change in the first angle range and the second angle range; and
      in response to determining the change in the one of the plurality of angle ranges and the another of the plurality of the angle ranges matches the stored change in the first angle range and the second angle range, specify the stored direction as the rotating direction.

18. The rotation detecting apparatus according to claim 3, further comprising a memory configured to store a relation of correspondence between a stored direction and a stored change in a first angle range and a second angle range,
   wherein the processor is configured to:
      determine whether the change in the one of the plurality of angle ranges and the another of the plurality of the angle ranges matches the stored change in the first angle range and the second angle range; and
      in response to determining the change in the one of the plurality of angle ranges and the another of the plurality of the angle ranges matches the stored change in the first angle range and the second angle range, specify the stored direction as the rotating direction.

19. An electronic timepiece comprising:
the rotation detecting apparatus according to claim 1, wherein the rotating member is a crown.

* * * * *

UNITED STATES PATENT AND TRADEMARK OFFICE
CERTIFICATE OF CORRECTION

PATENT NO. : 11,327,445 B2
APPLICATION NO. : 16/589194
DATED : May 10, 2022
INVENTOR(S) : Atsushi Kato It is certified that error appears in the above-identified patent and that said Letters Patent is hereby corrected as shown below:

In the Claims

Column 13, Claim 14, Line 30 should read:
ranges and the another of the plurality of the Column 13, Claim 15, Line 43 should read:
ranges and the another of the plurality of the Column 14, Claim 16, Line 10 should read:
ranges and the another of the plurality of the Signed and Sealed this
Thirteenth Day of December, 2022

Katherine Kelly Vidal
*Director of the United States Patent and Trademark Office*